(12) United States Patent  (10) Patent No.: US 8,424,381 B1
Lamphere et al.  (45) Date of Patent: Apr. 23, 2013

(54) FLUID LEVEL MEASURING DEVICE (75) Inventors: David A. Lamphere, Westford, VT (US); William M. Roberts, North Ferrisburgh, VT (US)

(73) Assignee: Liquid Measurement Systems, Inc., Georgia, VT (US)

( * ) Notice: Subject to any disclaimer, the term of this patent is extended or adjusted under 35 U.S.C. 154(b) by 264 days.

(21) Appl. No.: 12/791,109

(22) Filed: Jun. 1, 2010

Related U.S. Application Data (60) Provisional application No. 61/184,411, filed on Jun. 5, 2009.

(51) Int. Cl.
*G01F 23/26* (2006.01)

(52) U.S. Cl.
USPC ........................................ 73/304 C

(58) Field of Classification Search ................ 73/304 C; 324/690
See application file for complete search history.

(56) References Cited

U.S. PATENT DOCUMENTS

| | | | |
|---|---|---|---|
| 3,449,955 A | 3/1967 | Stadelmann | |
| 3,958,159 A * | 5/1976 | Rauchwerger | ................ 361/284 |
| 4,025,846 A | 5/1977 | Franz et al. | |
| 4,178,623 A | 12/1979 | Emmerich et al. | |
| 4,332,167 A | 6/1982 | Sun et al. | |
| 4,383,445 A | 5/1983 | Siegel et al. | |
| 4,457,170 A | 7/1984 | Thrift et al. | |
| 4,499,640 A | 2/1985 | Brenton et al. | |
| 4,499,767 A | 2/1985 | Fathauer et al. | |
| 4,549,245 A | 10/1985 | Fleckenstein | |
| 4,553,434 A | 11/1985 | Spaargaren | |
| 4,566,322 A | 1/1986 | Rau et al. | |
| 4,831,877 A | 5/1989 | Snow | |
| 4,831,878 A | 5/1989 | Hayashi et al. | |
| 4,939,932 A | 7/1990 | Ritzenthaler et al. | |
| 5,001,596 A | 3/1991 | Hart | |
| 5,088,323 A | 2/1992 | Johnson et al. | |
| 5,152,170 A | 10/1992 | Liu | |
| 5,272,918 A | 12/1993 | Gaston et al. | |
| 5,294,917 A * | 3/1994 | Wilkins | ........................ 340/625 |
| 5,595,088 A | 1/1997 | Horner | |
| 5,617,757 A | 4/1997 | Horner | |
| 5,701,084 A | 12/1997 | Borthwick, Jr. et al. | |
| 6,138,508 A | 10/2000 | Hannan et al. | |
| 6,164,132 A | 12/2000 | Matulek | |

(Continued)

FOREIGN PATENT DOCUMENTS

WO WO 2009010419 A1 * 1/2009

*Primary Examiner* — Peter Macchiarolo
*Assistant Examiner* — Natalie Huls
(74) *Attorney, Agent, or Firm* — Phillips Lytle LLP (57) ABSTRACT

A device (15) for measuring the level of a fluid (24) in a container (17) comprising a frame assembly having a first arm (18) and a second arm (19), the first and second arms configured to move from a first folded position (20) to a second expanded position (21), a probe element (22) supported between the first arm and the second arm, the probe element having a sensing portion (34, 35) between the arms when the arms are in the second expanded position, the sensing portion configured to have a length (25) in contact with the fluid, an electrical circuit (26, 29) connected to the probe element, the probe element and the circuit forming a capacitor having a capacitance which is a function of the length of the probe that is in contact with the fluid, and the circuit configured to produce an output signal as a function of the capacitance.

16 Claims, 5 Drawing Sheets

U.S. PATENT DOCUMENTS

| | | |
|---|---|---|
| 6,202,486 B1 | 3/2001 | Kemp |
| 6,216,534 B1 | 4/2001 | Ross, Jr. et al. |
| 6,295,869 B1 | 10/2001 | Delatte |
| 6,508,121 B2 | 1/2003 | Eck |
| 6,564,632 B2 | 5/2003 | Ross, Jr. |
| 6,810,731 B1 | 11/2004 | Lo |
| 6,837,222 B2 | 1/2005 | Okazono et al. |
| 6,941,808 B2 | 9/2005 | Gouzou et al. |
| 7,047,807 B2 * | 5/2006 | Woodard et al. ............ 73/304 C |
| 7,284,427 B2 | 10/2007 | Calabrese |
| 7,481,105 B2 | 1/2009 | Schillinger et al. |
| 7,516,679 B2 * | 4/2009 | Bell et al. .................... 73/866.5 |
| 2007/0235613 A1 * | 10/2007 | Bell et al. ................... 248/309.1 |

* cited by examiner

FIG. 6

FLUID LEVEL MEASURING DEVICE

CROSS-REFERENCE TO RELATED APPLICATIONS

This application claims the benefit of U.S. Provisional Patent Application No. 61/184,411, filed Jun. 5, 2009. The entire content of such application is incorporated by reference herein.

TECHNICAL FIELD

The present invention relates generally to the field of measuring systems and, more particularly, to an improved fluid level measuring device.

BACKGROUND ART

Different types of fluid level measuring systems are know in the prior art. For example, U.S. Pat. No. 6,202,486 is directed to an analog liquid level sensor for determining the location of the surface of liquid in a container. The sensor includes a hollow tubular stainless steel probe inserted into the container and having thermocouples operatively arranged within the probe to sense temperature above the liquid surface and beneath the liquid surface. Resistance of a wire within the probe together with temperature readings are used to determine the liquid level in the container.

U.S. Pat. No. 4,566,322 teaches an apparatus for electronically measuring the level of a liquid in a container, and particularly the level of gasoline in the gasoline tank of a vehicle. The device includes a conductor foil enclosed by a protective tube, the conductors of which form a temperature-dependent, externally heated resistor or electrodes of a measurement capacitor, and a conductor-foil support that is divided into three rigid sections every two of which are pivotally connected together in the manner of a toggle joint and being under spring tension in such a manner that the outermost section can rest against the bottom and the top side of the container.

U.S. Pat. No. 7,481,105 discloses a tank system with a fuel level gage that includes a measuring pipe in an enveloping element. The measuring pipe includes an ultrasound fuel level sensor that measures the fuel height in the pipe by the propagation time of an ultrasound signal emitted by the sensor and reflected back from the fuel surface.

DISCLOSURE OF THE INVENTION

With parenthetical reference to corresponding parts, portions or surfaces of the disclosed embodiment, merely for the purposes of illustration and not by way of limitation, the present invention provides a device (15) for measuring the level of a fluid (24) in a container (17) comprising a frame assembly having a first arm (18) and a second arm (19), the first and second arms configured to move from a first folded position (20) to a second expanded position (21), a probe element (22) supported between the first arm and the second arm, the probe element having a sensing portion (34, 35) between the arms when the arms are in the second expanded position, the sensing portion configured to have a length (25) in contact with the fluid, an electrical circuit (26, 29) connected to the probe element, the probe element and the circuit forming a capacitor having a capacitance which is a function of the length of the probe that is in contact with the fluid, and the circuit configured to produce an output signal as a function of the capacitance.

The frame assembly may comprise a mounting hub (28, 29) pivotally supporting the first and second arms and configured to engage the container. The mounting hub may comprise an annular threaded rim (30) configured to rotationally engage a corresponding threaded aperture in the container. The frame assembly may comprise a releasable locking bar (31) configured to extend between the first and second arms and to hold the first and second arms in the second expanded position.

The probe element may comprise a conductive wire (32) contained in a non-conductive sheath (33), and the conductive wire may comprise copper wire and the non-conductive sheath may comprise Teflon. The probe element may be flexible. The probe element may comprise a first sensing portion (34) extending between the first and second arms, a second sensing portion (35) extending generally perpendicular to the first sensing portion, and a cable tie (36) between the first sensing portion and the second sensing portion.

The circuit may comprise a terminal (29) in electrical contact with the frame assembly. The circuit may comprise a terminal in direct electrical contact with the tank or the fluid. The circuit may comprise a printed circuit board (26). The frame assembly may comprise a mounting hub (28, 29) pivotally supporting the first and second arms and configured to engage the container, the mounting hub comprising an aperture (40), and the PCB supported within the aperture.

The circuit may comprise a calibration mechanism for calibrating the output signal such that the output signal has a magnitude that varies substantially linearly with the fluid level in the container. The circuit may comprise a calibration mechanism for calibrating the output signal such that the output signal has a magnitude that varies with a variation in the volume of the fluid in the container. The device may further comprise a transmitter configured to wirelessly transmit the output signal.

The frame assembly may comprise a mounting hub pivotally supporting the first and second arms and configured to engage the container and the hub may comprise an alignment mechanism (42) for orientating the first and second arms in a vertical plane (y-y) within the container.

The fluid may comprise water and the container may comprise an airplane water tank.

An object of the invention is to provide a device for measuring the level of a fluid in a container. This and other objects and advantages will become apparent from the foregoing and ongoing written specification, the drawings, and the claims.

DESCRIPTION OF PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 1:
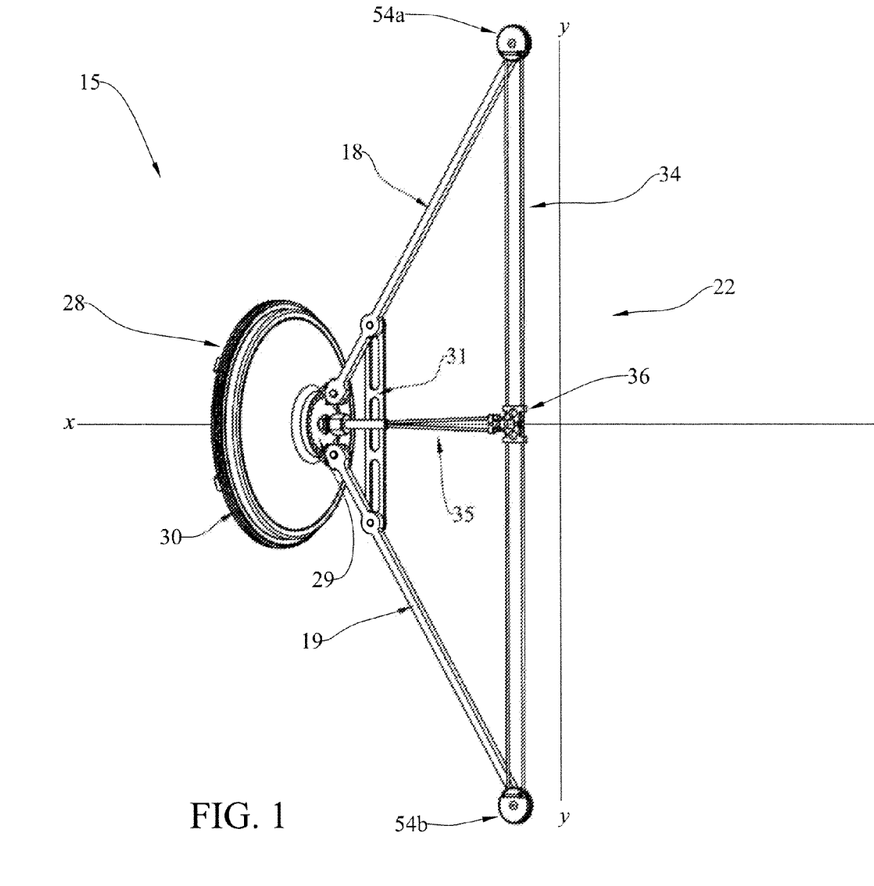
FIG. 1 is a perspective view of an embodiment of the device for measuring the level of a fluid in a container.
Figure 6:
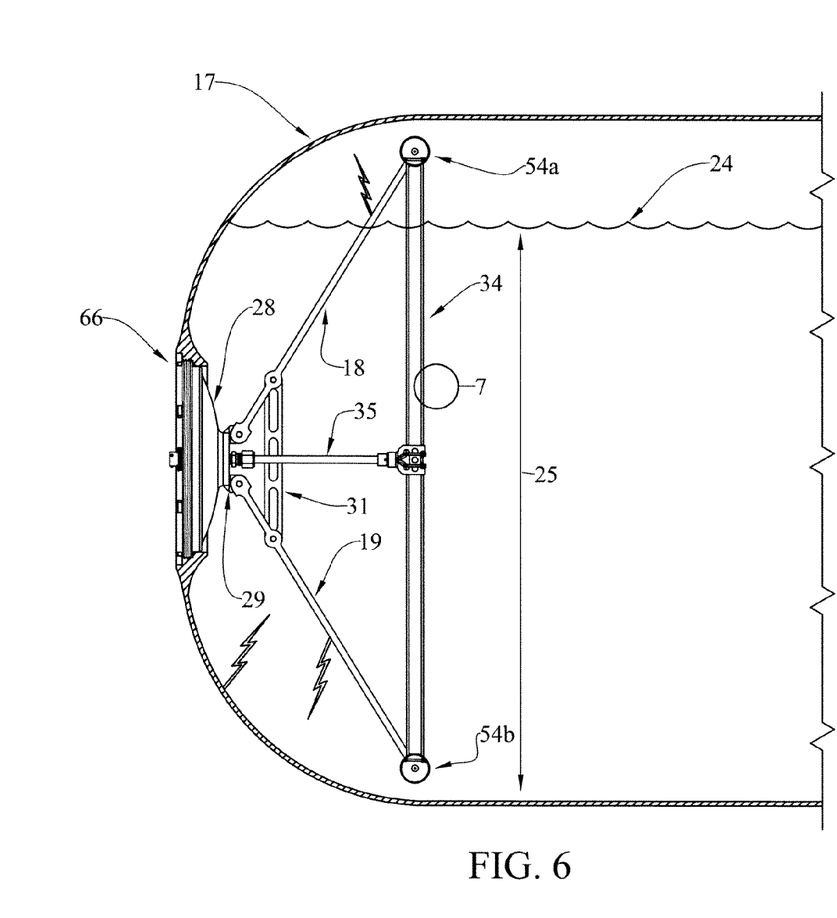
FIG. 6 is a view of the device shown in FIG. 1 in a water tank.

Referring now to the drawings and, more particularly, to FIGS. 1 and 6 thereof, this invention provides an improved device for measuring the level of a fluid in a container, the presently preferred embodiment of which is generally indicated at 15. Device 15 generally includes arms 18 and 19, which support probe element 22, pivotally connected to a hub assembly that includes interface 29, which houses printed circuit board (PCB) 26, and cover 28, which engages opening 66 in tank 17 and supports interface 29.

Figure 2:
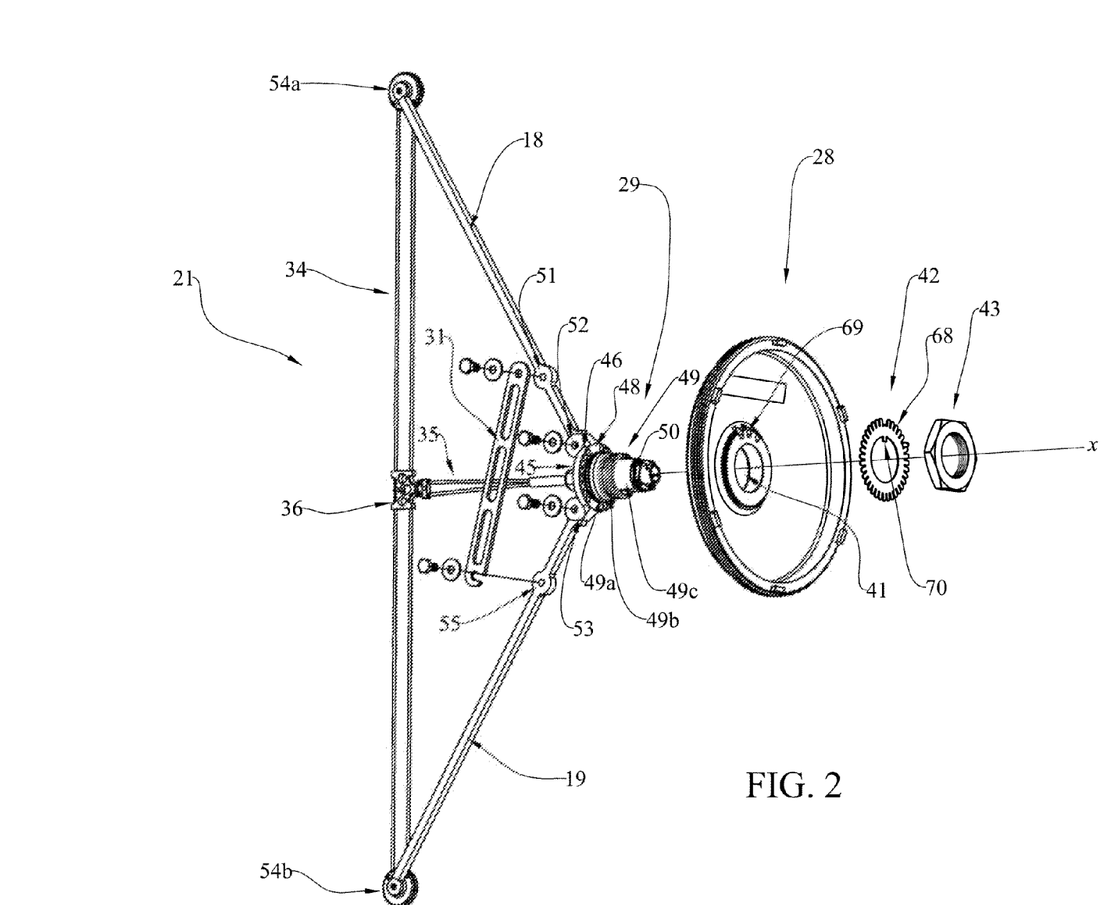
FIG. 2 is a partially exploded perspective view of the device shown in FIG. 1 in an expanded position.
Figure 3:
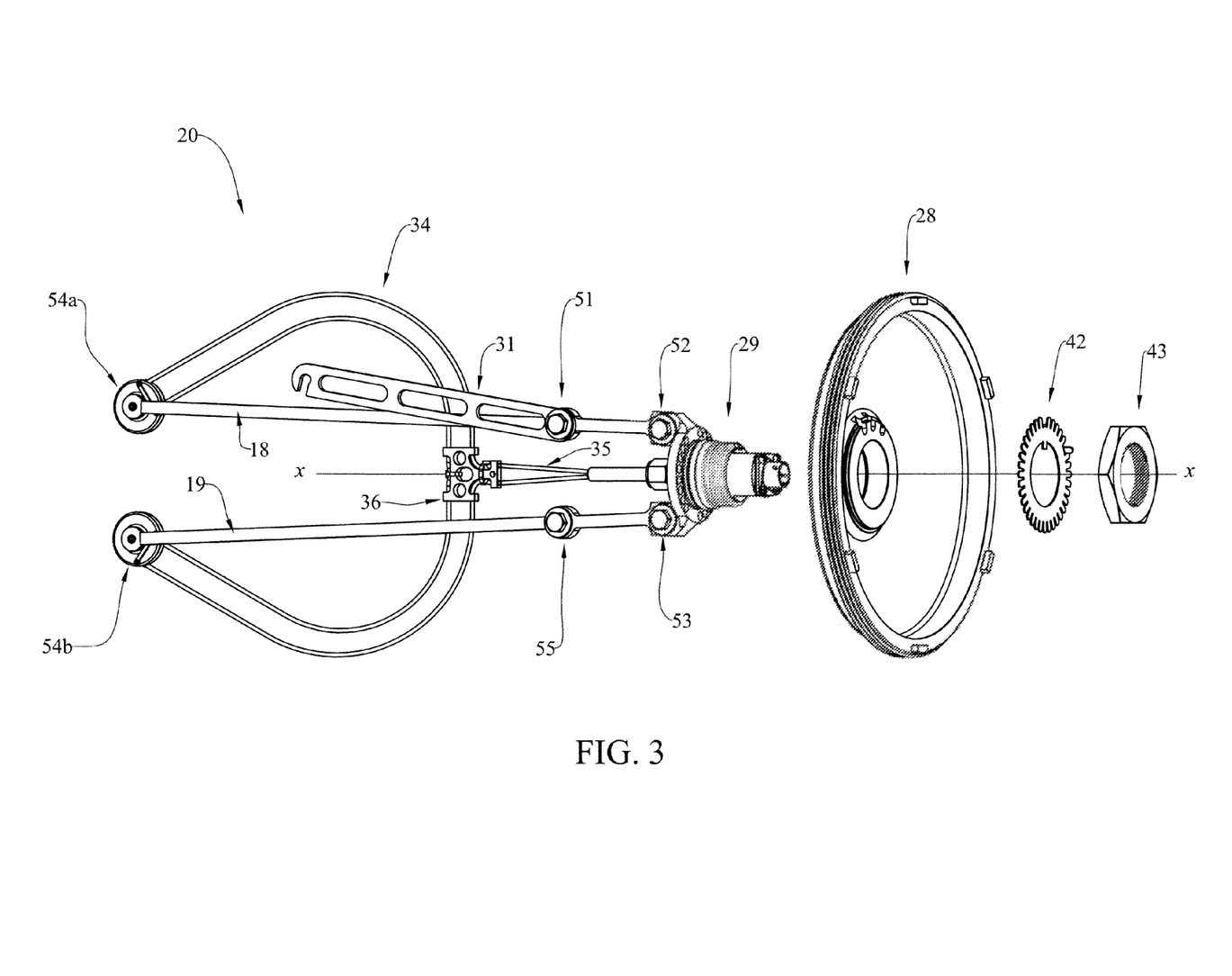
FIG. 3 is a partially exploded perspective view of the device shown in FIG. 1 in a folded position.

As shown in FIGS. 2-3 and 6, cover 28 is generally an annular member oriented about axis x-x and having an outer cylindrical rim 30 threaded to correspond to threaded opening 66 in tank 17. Cover 28 is sized for insertion into opening 66 in tank 17 and rotated to seal such opening. As shown, cover 28 also includes a central cylindrical aperture 41 orientated about axis x-x and configured to receive a portion of interface 29.

Interface 29 acts as an electrical terminal or interface for the circuit described below and the mechanical connection or interface between arms 18 and 19 and cover 28. As shown, interface 29 is a generally cylindrical annular structure oriented about axis x-x and bounded by a leftwardly-facing annular vertical surface 45, an outwardly-facing horizontal cylindrical surface 46, a rightwardly-facing annular vertical surface 48, a series of outwardly-facing cylindrical horizontal surfaces 49, a rightwardly-facing annular vertical surface 50, and a series of two inwardly-facing cylindrical horizontal surfaces. The left portion 49a of surface 49 includes a groove configured to receive O-ring 64, the middle portion 49b of surface 49 is threaded to correspond to the internal threads of nut 43, and the right end portion 49c of surface 49 has a reduced diameter. The right portion of the inwardly-facing cylindrical surface of interface 29 is configured and notched to receive and hold PCB 26, while the left portion of the inwardly-facing cylindrical surface of interface 29 is dimensioned and configured to receive the two ends of looped wire 32 and sealing gland 59.

As shown, interface 29 includes an upper connecting ring or ear 52 and a lower connecting ring or ear 53 extend from the edges of surfaces 45 and 46 about 180 degrees from each other. As shown in FIGS. 1-3, arms 18 and 19 extend from interface 29 and are bolted to rings 52 and 53, respectively to allow for pivotal movement thereabout between expanded position 21, as shown in FIG. 2, and folded position 20, as shown in FIG. 3. Releasable locking arm 31 is bolted between arms 18 and 19 to hold arms 18 and 19 in expanded position 21. Locking arm 31 extends from connection 51 on arm 18 to connection 55 on arm 19. A bolt and washer releasably hold the bottom end of locking arm 31 to connection 55 on arm 19. To fold arms 18 and 19, the bolt at connection 55 is loosened to allow the open end of arm 31 to be released and swung away to allow the folding of arms 18 and 19. Portion 34 of probe 22 is flexible and thereby does not restrict the folding of arms 18 and 19.

Sensor wire standoff elements 54a and 54b are riveted to the ends of arms 18 and 19 opposite to their pivot connection with rings 52 and 53, respectively. As shown, standoffs 54 retain probe element 22 between arms 18 and 19.

Probe element 22 is formed of copper wire 32 in a Teflon sheath 33. Probe element 22 extends from interface 29 horizontally to clip 36, down vertically to standoff 54b on the outer end of arm 19, up vertically through clip 36 to standoff 54a on the outer end of arm 18, down vertically to clip 36, and then back horizontally into aperture 40 of interface 29. Thus, when in expanded position 21, it includes a horizontally extending portion 35 and a vertically-extending portion 34 between the outer ends of arms 18 and 19.

Figure 4:
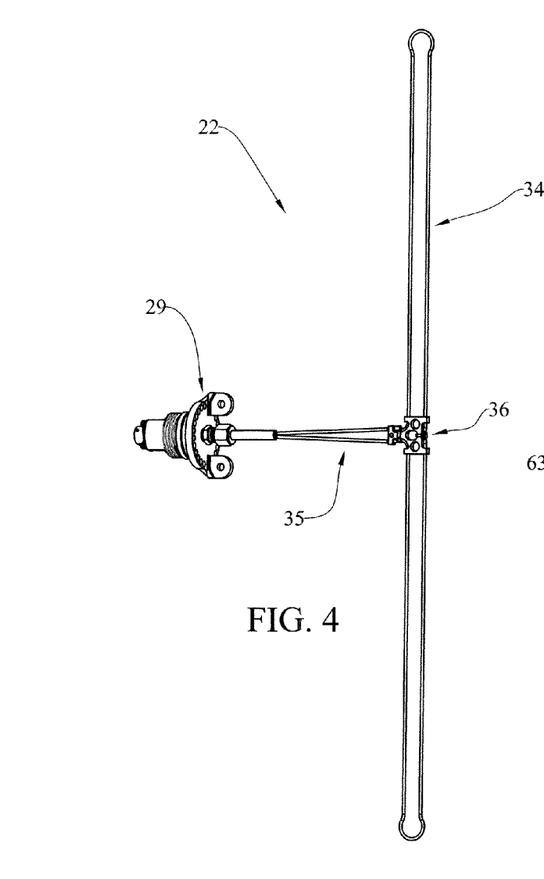
FIG. 4 is a perspective view of the circuit assembly shown in FIG. 1.
Figure 5:
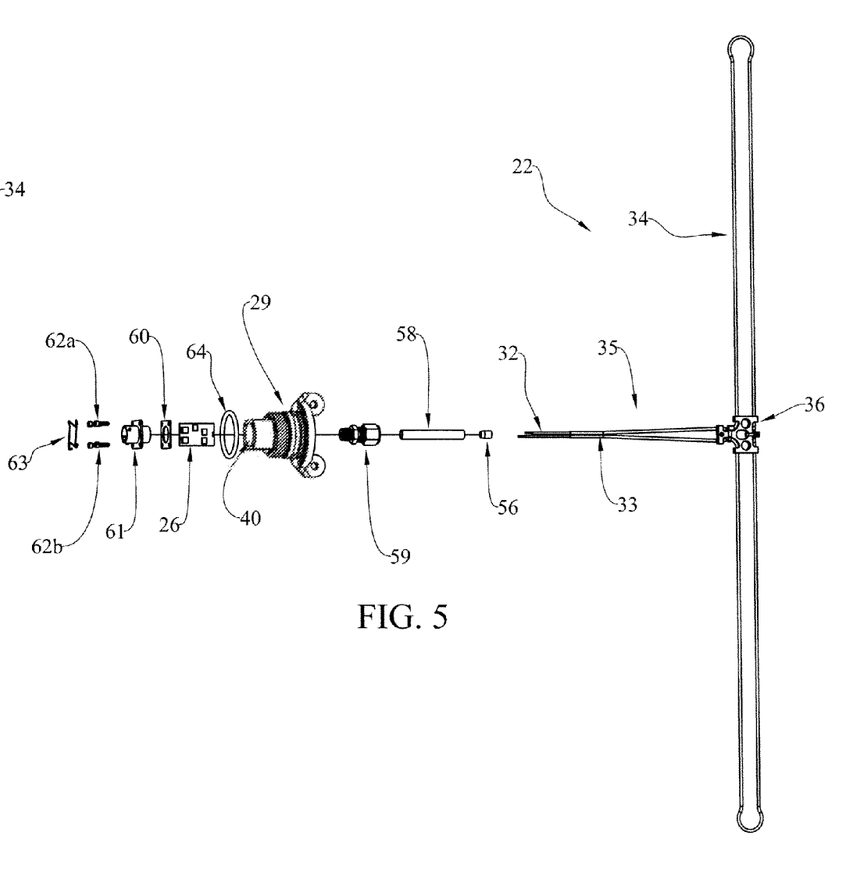
FIG. 5 is an exploded view of the circuit assembly shown in FIG. 4.

FIG. 4 is a perspective view of the circuit assembly of embodiment 15, which includes PCB 26 (not shown), interface 29 and probe element 22. FIG. 5 is an exploded view of the assembly of FIG. 4. As shown in FIG. 5, the circuit generally comprises a PCB 26 housed within a first portion of the inner cylindrical surface of interface 29 and communicating with sensor wire 32. The ends of wires 32 enter interface 29 through sealing sleeve insert 56, wire sealing sleeve 58 and sealing gland 59. Water sensor PCB 26 is retained within interface 29 with connector gasket 60, pin connector 61, cap screws 62a and 62b screwed into corresponding holes in surface 50 of interface 20, and safety wire 63. Aperture 41 of cover 28 has an inner diameter corresponding to the outer diameter of portion 49a so as to receive, together with O-ring 64, portion 49a of interface 29 in water tight engagement.

As shown, alignment washer 42 is configured with outer tabs 68 that engage corresponding pockets 69 in cover 28 and an inner protrusion 70 that fits into a corresponding groove in surface 49b of interface 29. Arms 18 and 19 are orientated or positioned, once inside tank 17 and expanded to position 21, in a vertical plane y-y such that arm 19 extends down to the bottom of tank 17 and arm 18 extends up to the top of tank 17. Tab lock washer 42 is aligned to retain, with protrusion 70 in the groove of interface 29 and tabs 68 bent into pockets 69 of cover 28, arms 18 and 19 in vertical plane y-y when interface 29 is inserted through aperture 41 and cover 28 is connected to opening 66 in tank 17. Hex nut 43 is tightened against lock washer 42 on threaded portion 49b of interface 29 so that the vertical alignment of arms 18 and 19 are maintained and a tight connection is provided.

Thus, arms 18 and 19 are adapted to be folded to allow for probe element 22 to be inserted through opening 66 into tank 17. Arms 18 and 19 are then unfolded to expanded position 21 so that portion 34 of probe 22 spans from the bottom of tank 17 to the top of tank 17. Locking arm 31 is then connected from connection 51 to connection 55 to lock arms 18 and 19 in their expanded position 21.

Figure 7:
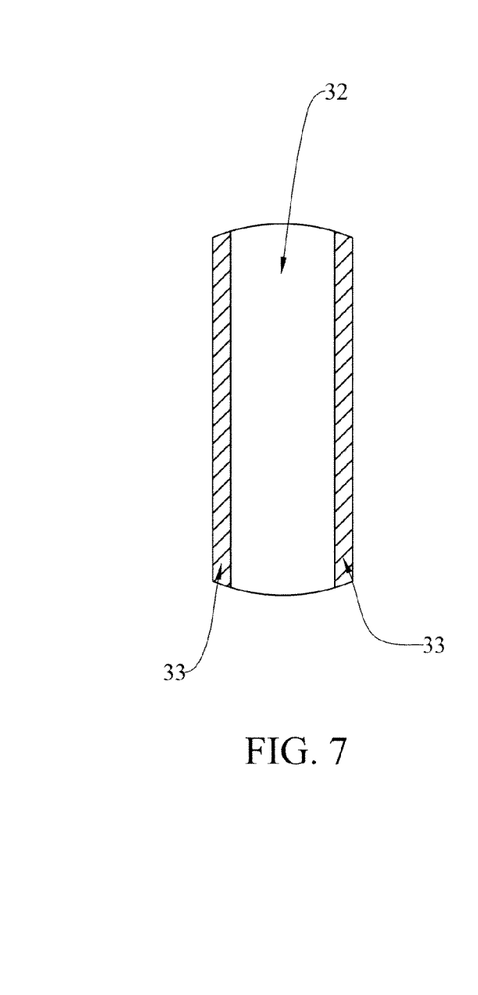
FIG. 7 is an enlarged vertical sectional view of the probe shown in FIG. 6, taken within the indicated circle of FIG. 6.

As shown in FIGS. 6 and 7, water 24 then covers a portion 25 of probe 22. The circuit assembly forms a capacitor, whose capacitance is a function of the water level and, in particular, the length 25 of probe 22 that is in contact with the water 24 in tank 17. Contained within interface 29 is a capacitance measurement circuit that provides a DC voltage output as a function of the water level. As the water level increases, the capacitance increases correspondingly, and vice versa. The resulting capacitance correlates to the water level and may be transmitted to a visual display. The transmission of the output may be wireless.

The model of a capacitor consists of two parallel conducting plates separated by a dielectric. The capacitance can be estimated by the equation (1)

$$C = \frac{\varepsilon A}{d} \quad (1)$$

where C is the capacitance, ε is the permittivity of the dielectric, d is the distance between the two plates, and A is the overlapping area the two plates.

In the present embodiment, the outer surface of wire 32 within probe element 22 serves as one capacitor plate, Teflon insulation 33 serves as the dielectric, and the column of water 24 directly surrounding probe element 22 serves as the second capacitor plate. Interface 29 acts as a terminal for the circuit as it is electrically connected to water 24 through arm 18. As water level 24 rises, the height of water 24 column surrounding wire 32 increases, thus increasing the area of the capacitor plate and capacitance of probe 22 as described by equations (2) and (3).

$$A = (\text{probe circumference})(\text{water height}) \quad (2)$$

$$C = \frac{\varepsilon (\text{probe circumference})(\text{water height})}{d} \quad (3)$$

Probe 22's change in capacitance can be detected by various circuit types, including a circuit which employs some form of oscillator. For example, probe element 22 may be placed in series with a resistor and an AC voltage applied to the circuit. In this embodiment, tank 17 may be an airplane water tank and the AC voltage may be generated by a voltage inverter connected to the airplane's DC power supply. The voltage drop across probe element 22 is a function of probe 22's capacitance, defined by the voltage divider equation (4) and its simplified form in equation (5)

$$V capacitor = \frac{\frac{1}{j\omega C}}{\frac{1}{j\omega C} + R} \quad (4)$$

$$V capacitor = \frac{1}{1 + j\omega RC} \quad (5)$$

where R is the resistance, C is the probe capacitance for a given water level, ω is the AC frequency, and Vcapacitor is the voltage across the capacitor. Substituting equation (2) into equation (4) shows that the voltage across the capacitor depends upon the water level.

$$V capacitor = \frac{1}{1 + j\omega R \frac{\varepsilon (\text{probe circumference})(\text{water height})}{d}} \quad (6)$$

$$V capacitor = f(\text{water height}) \quad (7)$$

A standard amplifier is used to amplify any change in capacitor voltage.

Alternatively, a circuit which detects the change in resonance frequency of an RC series circuit with probe element 22 could be employed. Also, a digital circuit for detecting the change in probe capacitance may be constructed with a digital timer such as an ICM7555. The timer would be arranged with probe element 22 wired as the timer's frequency control capacitor, causing the timer output frequency to depend upon the water level. Other circuit configurations may be used to detect the change in capacitance of probe 22 as individuals skilled in the art will recognize.

Embodiment 15 has the unexpected benefit in that the output signal corrects for the nonlinearity between the water level and remaining volume for a horizontal barrel water tank. In a horizontal barrel tank, more volume is contained about the center height of the tank then at the top and bottom portions. Because embodiment 15's probe element contains horizontal portion 35, a "corrective" increase in capacitance occurs as the water level crosses over the center height of the tank. Thus, embodiment 15's output signal more accurately matches the remaining volume in the tank.

In order to further increase the accuracy of device 15, a calibration mechanism may be included. Such a calibration mechanism could include a lookup table function which maps the measured probe capacitance to known water levels or known water volumes experimentally obtained for a given tank. This allows the device to accurately report remaining fluid volume for tanks with varying cross sectional volumes.

Thus, embodiment 15 is a self-contained fluid level measuring system. Teflon sheath 33 acts as a reliable insulating dielectric and does not absorb water making the system more reliable. Sheath 33 also sheds water better then a fiberglass tank wall, thus eliminating false readings do to condensation. System 15 also operates independently of tank 17, making it easier to install and maintain. In addition, system 15 does not require special tank manufacturing and may be used with standard tanks and with tanks already in place. Furthermore, system 15 does not require an external signal conditioner and thus eliminates the need for an additional connector.

The present invention contemplates that many changes and modifications may be made. Therefore, while the presently-preferred form of the improved apparatus has been shown and described, and a number of alternatives discussed, persons skilled in this art will readily appreciate that various additional changes and modifications may be made without departing from the spirit of the invention, as defined and differentiated by the following claims.

What is claimed is:

1. A device for measuring the level of a fluid in a container comprising:
   a frame assembly having a first arm and a second arm, said first and second arms configured to move from a first folded position to a second expanded position;
   a probe element supported between said first arm and said second arm;
   said probe element having a sensing portion between said arms when said arms are in said second expanded position;
   said sensing portion configured to have a length in contact with said fluid;
   an electrical circuit connected to said probe element;
   said probe element and said circuit forming a capacitor having a capacitance which is a function of said length of said probe that is in contact with said fluid;
   said circuit configured to produce an output signal as a function of said capacitance; and
   said circuit comprising a terminal in electrical contact with said frame assembly.

2. The device set forth in claim 1, wherein said probe element comprises a conductive wire contained in a nonconductive sheath.

3. The device set forth in claim 2, wherein said conductive wire comprises copper wire and said non-conductive sheath comprises polytetrafluoroethylene.

4. The device set forth in claim 1, wherein said probe element is flexible.

5. The device set forth in claim 1, wherein said circuit comprises a terminal in direct electrical contact with said tank or said fluid.

6. The device set forth in claim 1, wherein said circuit comprises a PCB;
said frame assembly comprises a mounting hub pivotally supporting said first and second arms and configured to engage said container;
said mounting hub comprises and aperture; and
said PCB is supported within said aperture.

7. The device set forth in claim 1, wherein said circuit comprises a calibration mechanism for calibrating said output signal such that said output signal has a magnitude that varies linearly with said fluid level in said container.

8. The device set forth in claim 1, wherein said circuit comprises a calibration mechanism for calibrating said output signal such that said output signal has a magnitude that varies with a variation in the volume of said fluid in said container.

9. The device set forth in claim 1, wherein said circuit comprises an oscillator.

10. The device set forth in claim 1, and further comprising a transmitter configured to wirelessly transmit said output signal.

11. The device set forth in claim 1,
wherein said container comprises an airplane water tank.

12. The device for measuring the level of a fluid in a container comprising:
a frame assembly having a first arm and a second arm, said first and second arms configured to move from a first folded position to a second expanded position;
a probe element supported between said first arm and said second arm;
said probe element having a sensing portion between said arms when said arms are in said second expanded position;
said sensing portion configured to have a length in contact with said fluid;
an electrical circuit connected to said probe element;
said probe element and said circuit forming a capacitor having a capacitance which is a function of said length of said probe that is in contact with said fluid;
said circuit configured to produce an output signal as a function of said capacitance;
said frame assembly comprising a mounting hub pivotally supporting said first and second arms and configured to engage said container; and
said mounting hub comprising an annular threaded rim configured to rotationally engage a correspondingly threaded aperture in said container.

13. A device for measuring the level of a fluid in a container comprising:
a frame assembly having a first arm and a second arm, said first and second arms configured to move from a first folded position to a second expanded position;
a probe element supported between said first arm and said second arm;
said probe element having a sensing portion between said arms when said arms are in said second expanded position;
said sensing portion configured to have a length in contact with said fluid;
an electrical circuit connected to said probe element;
said probe element and said circuit forming a capacitor having a capacitance which is a function of said length of said probe that is in contact with said fluid;
said circuit configured to produce an output signal as a function of said capacitance; and
said frame assembly comprising a releasable locking bar configured to extend between said first and second arms and to hold said first and said second arms in said second expanded position.

14. A device for measuring the level of a fluid in a container comprising:
a frame assembly having a first arm and a second arm, said first and second arms configured to move from a first folded position to a second expanded position;
a probe element supported between said first arm and said second arm;
said probe element having a sensing portion between said arms when said arms are in said second expanded position;
said sensing portion configured to have a length in contact with said fluid;
an electrical circuit connected to said probe element;
said probe element and said circuit forming a capacitor having a capacitance which is a function of said length of said probe that is in contact with said fluid;
said circuit configured to produce an output signal as a function of said capacitance; and
said probe element comprising a first sensing portion extending between said first and second arms, a second sensing portion extending generally perpendicular to said first sensing portion, and a cable tie between said first sensing portion and said second sensing portion.

15. A device for measuring the level of a fluid in a container comprising:
a frame assembly having a first arm and a second arm, said first and second arms configured to move from a first folded position to a second expanded position;
a probe element supported between said first arm and said second arm;
said probe element having a sensing portion between said arms when said arms are in said second expanded position;
said sensing portion configured to have a length in contact with said fluid;
an electrical circuit connected to said probe element;
said probe element and said circuit forming a capacitor having a capacitance which is a function of said length of said probe that is in contact with said fluid;
said circuit configured to produce an output signal as a function of said capacitance;
said frame assembly comprising a mounting hub pivotally supporting said first and second arms and configured to engage said container; and
said hub comprising an alignment mechanism for orientating said first and second arms in a vertical plane within said container.

16. The device set forth in claim 15, wherein said fluid comprises water.

* * * * *